(12) United States Patent (10) Patent No.: US 8,947,522 B1
Hickman et al. (45) Date of Patent: Feb. 3, 2015

(54) SYSTEMS AND METHODS TO ADJUST ACTIONS BASED ON LATENCY LEVELS

(75) Inventors: Ryan Hickman, Mountain View, CA (US); Damon Kohler, Munich (DE)

(73) Assignee: Google Inc., Mountain View, CA (US)

( * ) Notice: Subject to any disclaimer, the term of this patent is extended or adjusted under 35 U.S.C. 154(b) by 302 days.

(21) Appl. No.: 13/464,586

(22) Filed: May 4, 2012

Related U.S. Application Data

(60) Provisional application No. 61/596,994, filed on Feb. 9, 2012, provisional application No. 61/483,300, filed on May 6, 2011.

(51) Int. Cl.
*H04N 7/00* (2011.01)
*H04N 7/15* (2006.01)
*H04M 3/56* (2006.01)

(52) U.S. Cl.
CPC *H04N 7/15* (2013.01); *H04M 3/567* (2013.01)
USPC .......................................................... 348/114

(58) Field of Classification Search
CPC ................................. H04N 7/15; H04M 3/567
USPC .......................................................... 348/114
See application file for complete search history.

(56) References Cited

U.S. PATENT DOCUMENTS

| | | |
|---|---|---|
| 2010/0070079 A1 | 3/2010 | Mangaser et al. |
| 2011/0158146 A1* | 6/2011 | Poola et al. ................... 370/312 |
| 2011/0222466 A1* | 9/2011 | Pance et al. .................... 370/316 |
| 2011/0268023 A1* | 11/2011 | Srinivasan et al. ............ 370/328 |
| 2012/0144336 A1* | 6/2012 | Pinter et al. .................... 715/772 |

FOREIGN PATENT DOCUMENTS

WO 2009091536 7/2009

OTHER PUBLICATIONS

Malinowski et al., Real Time Control of a Robotic Manipulator via Unreliable Internet Connection, IECON'01, 27th Annual Conference of the IEEE Industrial Electronics Society, Nov. 29, 2001.

* cited by examiner

*Primary Examiner* — Richard Torrente
(74) *Attorney, Agent, or Firm* — McDonnell Boehnen Hulbert & Berghoff LLP

(57) ABSTRACT

Systems and methods to adjust actions based on latency levels are described. The method may be executable to determine an action being performed by a robotic device. The method may also be executable to generate data based on execution of the action to provide to a server and receive information indicative of latency attributable to communication between the robotic device and a server. The method may also determine a priority at which to provide the generated data to the server and provide the generated data to the server in an order based on the priority. When the latency is above a threshold amount, the method may identify information of the generated data having a given priority above a threshold level and provide a reduced resolution version of the identified information to the server.

16 Claims, 10 Drawing Sheets

SYSTEMS AND METHODS TO ADJUST ACTIONS BASED ON LATENCY LEVELS

CROSS-REFERENCE TO RELATED PATENT APPLICATIONS

This patent application claims priority to U.S. Application No. 61/483,300 filed on May 6, 2011, and to U.S. Application No. 61/596,994 filed on Feb. 9, 2012, the contents of each of which are entirely incorporated herein by reference, as if fully set forth in this application.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software that collect commands from the user and interpret the commands into commands on the servers. The servers may handle the computing, and can either store or retrieve information from database servers or file servers and display an updated page to the user. Through "cloud computing", data across multiple servers can be synchronized around the world allowing for collaborative work on one file or project, from multiple users around the world, for example.

SUMMARY

This disclosure may disclose, inter alia, methods and systems for robot cloud computing.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of devices may be used or configured as a means for performing functions of any of the methods described herein (or any portions of the methods described herein).

In some examples, a method may include determining an action being performed by a robotic device, wherein the robotic device includes a mechanical actuator. The method may also include generating data based on execution of the action to provide to a server and receiving information indicative of a latency attributable to communication between the robotic device and a server. The method may also include determining a priority at which to provide the generated data to the server and providing, by the robotic device, the generated data to the server in an order based on the priority, wherein the generated data has a first resolution. When the latency is above a threshold amount, the method may include identifying information of the generated data having a given priority above a threshold level and providing a reduced resolution version of the identified information to the server, wherein the reduced resolution version of the identified information is less than the first resolution.

In additional examples, a system may include a robotic device having a sensor, a computing system including a non-transitory computer-readable medium, and program instructions stored on the non-transitory computer-readable medium and executable to cause the computing system to perform a number of functions. The functions may include determining an action being performed by a robotic device, wherein the robotic device includes a mechanical actuator. The functions may also include generating data based on execution of the action to provide to a server and receiving information indicative of a latency attributable to communication between the robotic device and a server. The functions may further include determining a priority at which to provide the generated data to the server and providing, by the robotic device, the generated data to the server in an order based on the priority, wherein the generated data has a first resolution. When the latency is above a threshold amount, the system may include functions to identify information of the generated data having a given priority above a threshold level and provide a reduced resolution version of the identified information to the server, wherein the reduced resolution version of the identified information is less than the first resolution.

In yet additional examples, a computer-readable memory may have stored thereon instructions executable by a computing device having at least one processor to cause the computing device to perform functions. The functions may include determining an action being performed by a robotic device, wherein the robotic device includes a mechanical actuator. The functions may also include generating data based on execution of the action to provide to a server and receiving information indicative of a latency attributable to communication between the robotic device and a server. Moreover, the functions may include determining a priority at which to provide the generated data to the server and providing, by the robotic device, the generated data to the server in an order based on the priority, wherein the generated data has a first resolution. When the latency is above a threshold amount, the functions may identify information of the generated data having a given priority above a threshold level and provide a reduced resolution version of the identified information to the server, wherein the reduced resolution version of the identified information is less than the first resolution.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for robot cloud computing. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from the robot depending on requirements. In some examples, a robot may be configured to receive a second device, such as a mobile phone, that may be configured to function as an accessory or a "brain" of the robot.

In examples described herein, a robot may interact with the cloud to perform any number of actions, such as to share information with other cloud computing devices. Within examples, a server may receive a location of a robot, and may determine a future location of the robot. The server may then determine a representation of image data from the robot corresponding to the future location, and send the representation to a user. In this manner, a user may receive image data corresponding to a view of the robot as currently seen by the robot so as to enable remote control of the robot over weakly connected networks. In other examples, a robot may be moving forward, and may capture image data of the forward view. The image data may be provided to a user, and the cloud may also provide alternate views from the standpoint of the robot to the user. A robot-user interface may be provided that is overlaid onto image data received from the robot.

1. CLOUD COMPUTING ARCHITECTURE

Figure 1:
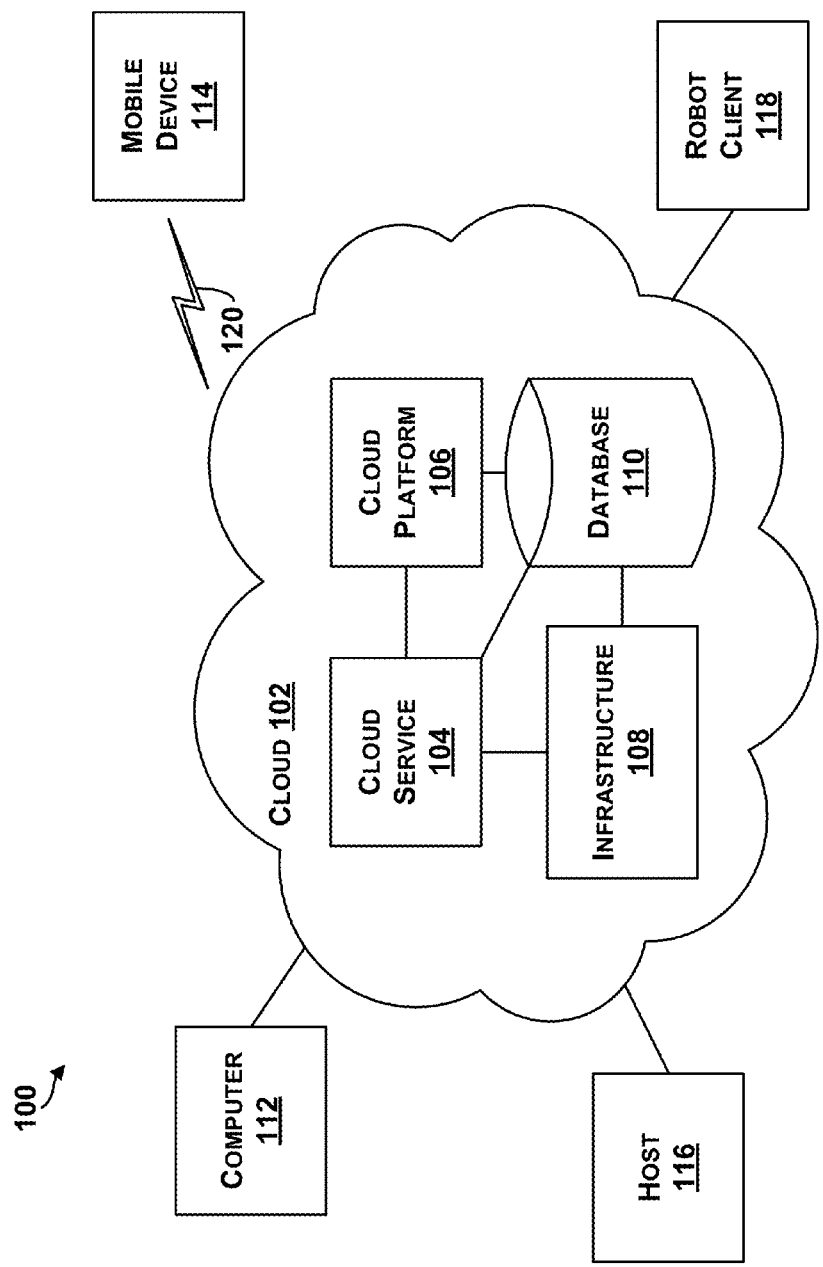
FIG. 1 is an example system for cloud-based computing.

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more or fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 may represent a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device or transmitter including a laptop computer, a mobile telephone, etc., that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured to use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. EXAMPLE ROBOT ARCHITECTURE

Figure 2A:
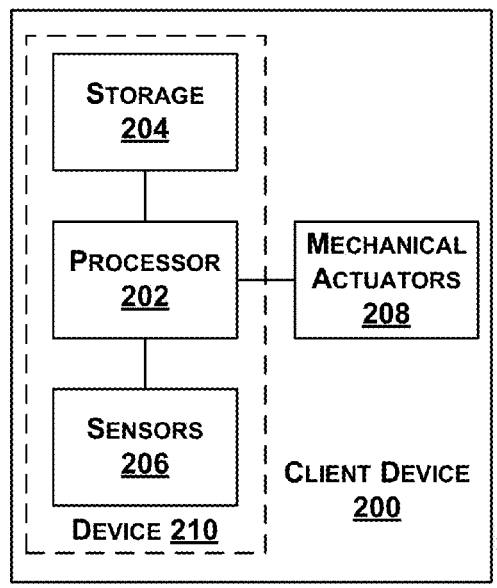
FIG. 2A illustrates an example client device.

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, and sensors 206) may all be custom designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscope, accelerometer, a camera, radar, capacitive sensors and touch sensors, etc.

The client device 200 may also have components or devices that allow the client device 200 to interact with its environment. For example, the client device 200 may have mechanical actuators 208, such as motors, wheels, movable arms, etc., that enable the client device 200 to move or interact with the environment.

In some example, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the client device 200 may be configured to receive a device, such as device 210, that includes the processor 202, the storage 204, and the sensors 206. For example, the client device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the Internet. This robot may be able to connect to a user's cellular phone via a wireless technology (e.g., Bluetooth) to be able to access the Internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch screen, etc., that are included within the device 210.

Figure 2B:
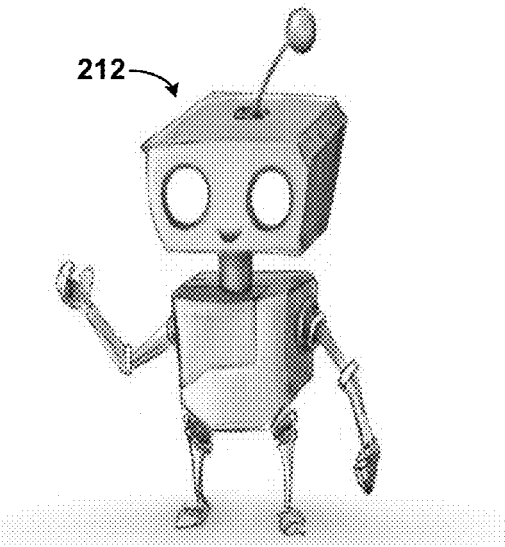
FIG. 2B illustrates a graphical example of a robot.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
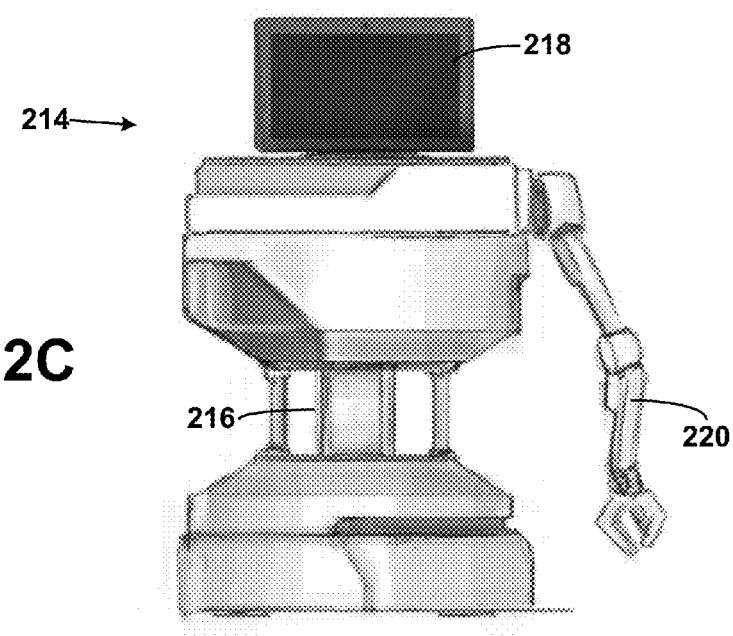
FIG. 2C illustrates another example of a robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

3. ROBOT AND CLOUD INTERACTION

Figure 3:
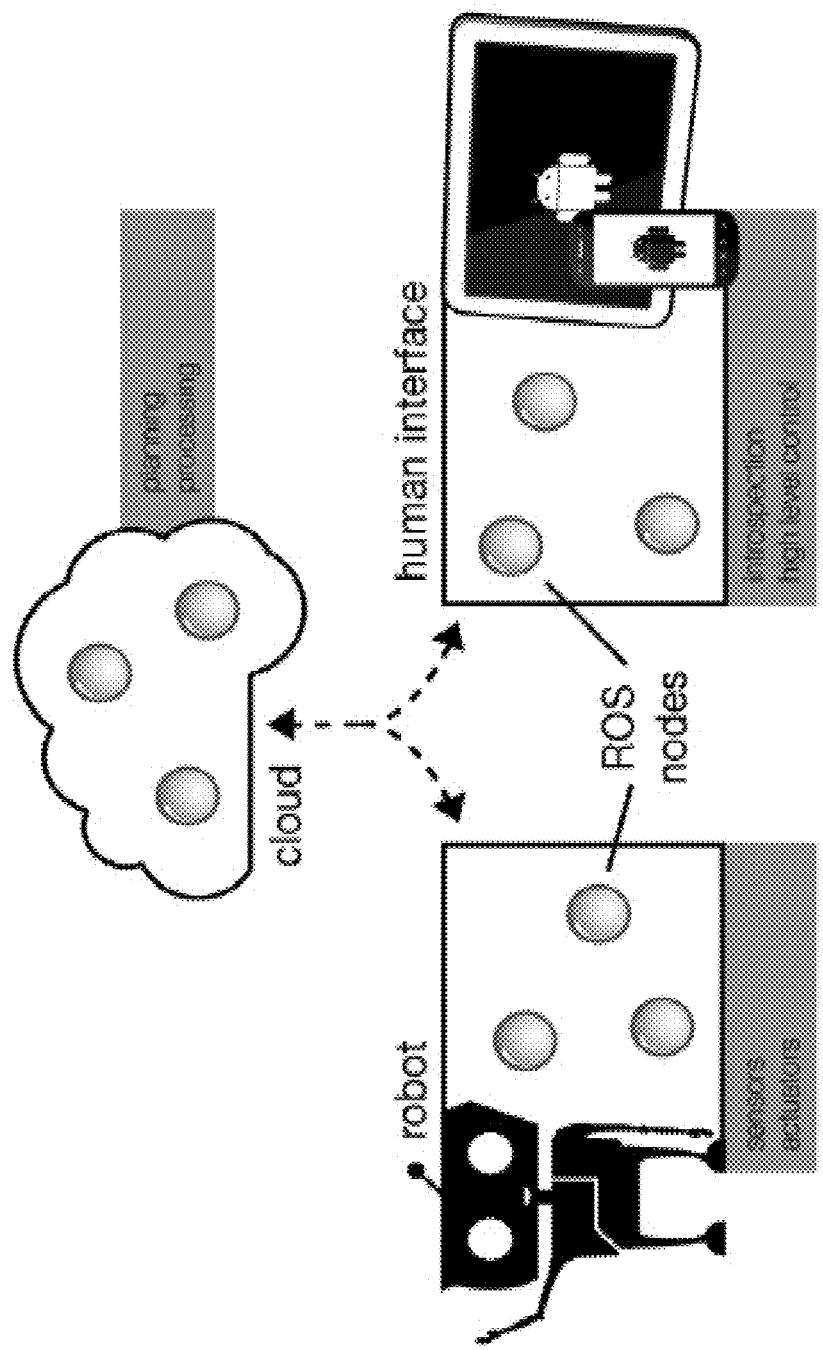
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the Internet.

Figure 4:
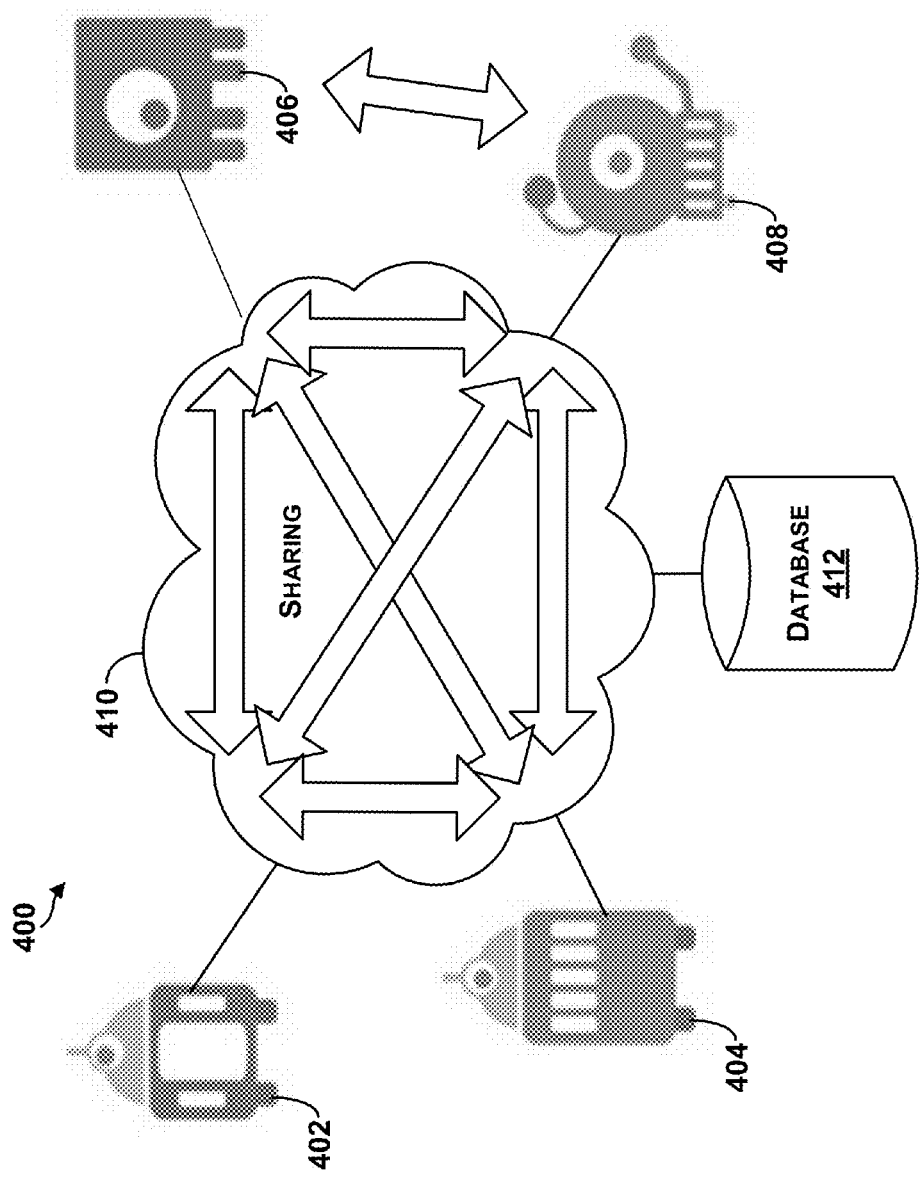
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data to all the robots connected to the cloud 410 about the recognized object, as well as possibly about other characteristics (e.g., metadata) of the recognized object, such as a location, size, weight, color, etc. Thus, every robot may be able to know attributes of an object in a photo uploaded by the robot 402.

The robots 402, 404, 406, and 408 may perform any number of actions with an area, people, other robots, etc. In one example, each robot 402, 404, 406, and 408 has WiFi or other network based connectivity and will upload/publish data to the cloud 410 that can then be shared with any other robot. In this manner, each robot 402, 404, 406, and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., such as for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and build a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map).

Thus, within examples, the robots 402, 404, 406, and 408 may share information through the cloud 410, and may access the database 412.

4. ROBOT AND CLOUD FUNCTIONS BASED ON LATENCY OF THE CLOUD

As mentioned, robots (or any client computing device) may interact with the cloud to perform any number of functions. Functions may be delayed or modified based on a latency of the cloud. For example, the cloud may comprise a number of networks, and in instances in which the robot is coupled to the cloud and communicate via the cloud, messages to and from the robot may be delayed due to limitations of the networks.

In some examples, a location of a robot may be determined based upon a GPS sensor on the robot. For instance, the robot may provide its location to the cloud using the GPS sensor. The robot may use other location sensors or functions to determine a location, such as cellular tower triangulation methods or WiFi localization techniques. However, in other examples, a robot may not be able to use GPS to determine its location, such as, when network conditions prevent the robot from either determining or transmitting its exact location. In such examples, a location of the robot may be estimated based on a planned or known trajectory or path (e.g., location, speed, direction, etc.).

In some examples, a user may control or operate a robot over the cloud (e.g., send commands to the robot over the cloud), and the cloud may comprise a number of networks. The robot may have a camera, and a user may receive an output of the camera so as to see a view from the robot's point of view to enable control of the robot. In some examples, a robot may be moving forward and collecting image data that is provided to a server. A user may view the image data in real-time, however, the user will receive the image data at a time after the robot has collected the data. A user would like to have a representation of images seen at a current state by the robot (rather than those seen one second ago, for example), to see an exact or substantially exact representation of image data as seen by the robot. The server may thus develop a representation of image data representing data expected to be collected by the robot, and provide the representation to the user so that the user has a representation of images seen at a current state by the robot.

Figure 5:
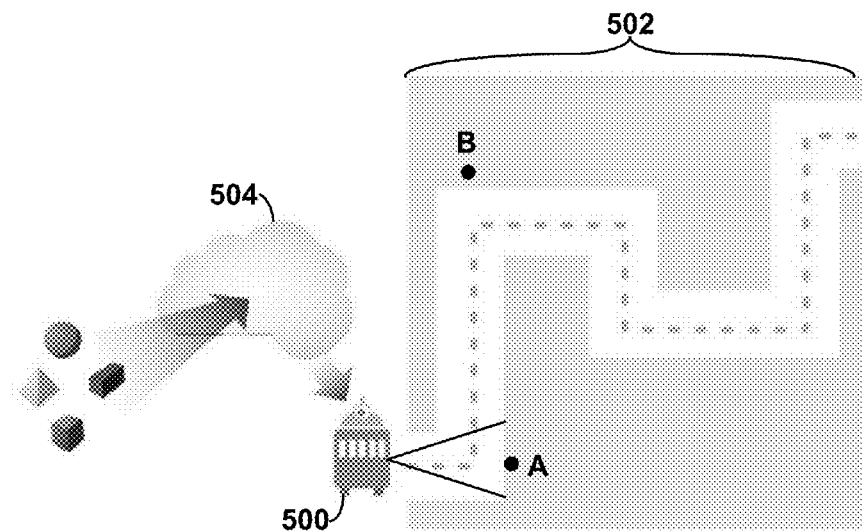
FIG. 5 illustrates an example robot navigating through a pathway.

FIG. 5 illustrates an example robot navigating through a pathway. In FIG. 5, a robot 502 traverses through an area 502 following a pathway. The robot 500 may communicate with a cloud 504 to receive information indicating the pathway, for example. The robot 500 may include a camera and may capture images as the robot 500 traverses through the pathway. As mentioned, the camera data may be provided to a user via the cloud 504 so that the user may see image data from a point of view of the robot.

To overcome any latency issues with the cloud 504 or delivery of the image data, the cloud 504 or components of the cloud may estimate a representation of image data expected to be collected by the robot based on the pathway that the robot 500 is traveling. The cloud 504 may have access to or include a database of maps, navigation pathways, and image data corresponding to points along the navigation pathways or points in the maps. The cloud 504 can determine location data from the robot 500 or estimate a location of the robot 500 based on commands sent to the robot as described above (e.g., known pathway, speed, and beginning location). Based on the location information of the robot 500, the cloud 504 can determine a future location of the robot 500 and develop a representation of image data corresponding to the future location. The cloud 504 may then provide the representation of image data corresponding to the future location to the user.

The cloud 504 may develop the representation of image data corresponding to the future location by retrieving such image data from the database that corresponds to the future location. The cloud 504 may retrieve still images, and create a video feed, for example, to be provided to the user. The cloud 504 may provide the estimated representation as well as real-time data received from the robot 500 to the user so that the user may have both data.

Figure 6:
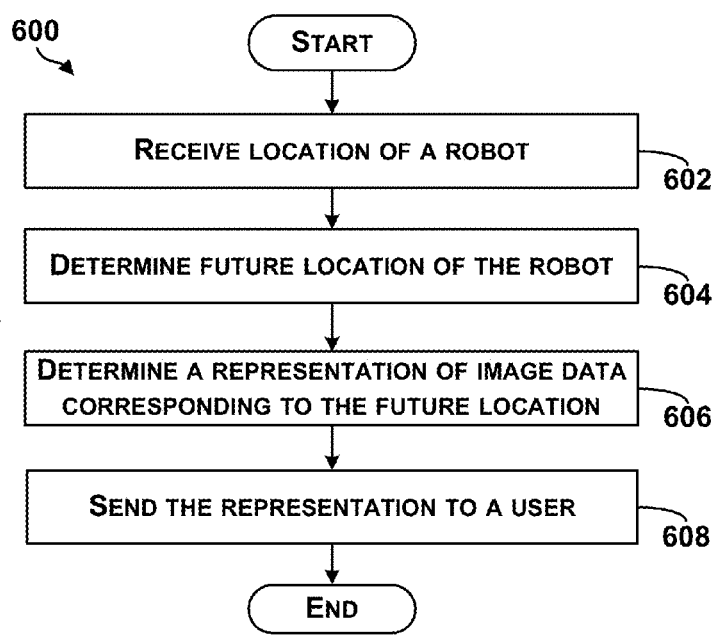
FIG. 6 is a block diagram of an example method of a robot interaction with the cloud to facilitate object recognition.

FIG. 6 is a block diagram of an example method of a robot interaction with the cloud to facilitate object recognition, in accordance with at least some embodiments described herein. Method 600 shown in FIG. 6 presents an embodiment of a method that, for example, could be used with the systems 100 and 400, for example, and may be performed by a device, such as another devices illustrated in FIGS. 1-4, or components of the device. Method 600 may include one or more operations, functions, or actions as illustrated by one or more of blocks 602-608. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 600 and other processes and methods disclosed herein, each block in FIG. 6 may represent circuitry that is wired to perform the specific logical functions in the process.

At block 602, the method 600 includes receive location of a robot. For example, as described above, the robot may include a GPS and may provide a location to a server, or the server may estimate the location of the robot based on a known beginning location, a speed of movement of the robot, and a navigation pathway traversed by the robot.

At block 604, the method 600 includes determine future location of the robot. The server may estimate a future location of the robot based on a known beginning location, a speed of movement of the robot, and a navigation pathway traversed by the robot. The future location of the robot may be a location of the robot at a time into the future, e.g., a predetermined amount of time after a current time. The predetermined amount of time may be approximately equivalent to a latency of the cloud. As an example, the server may determine a current location of the robot at time 4:00. The latency of the cloud may be determined to be about 1 minute, and thus, the server may determine a future location of the robot, or a location where the robot is expected to be at time 4:01. The predetermined amount of time may be set by a user, the server, or may vary based on latency of the cloud.

At block 606, the method 600 includes determine a representation of image data corresponding to the future location.

Continuing with the example above, the server may determine a representation of image data corresponding to the location where the robot is expected to be at time 4:01. The server may determine the representation of image data by accessing a database and retrieving image data corresponding to the future location.

At block 608, the method 600 includes send the representation to a user. For example, the server may forward the representation to the user.

Using the example method 600 in FIG. 6, a user may receive image data corresponding to a view of the robot as approximately currently seen by the robot so as to enable remote control of the robot over weakly connected networks, for example.

5. LATENCY OPTIMIZATION

As mentioned, a number of functions may be delayed when a robot (or any client computing device) interacts with the cloud. The delay may be caused by factors such as processing delays, unreliable networks, dropped and/or lost data packets, bandwidth problems, etc. In embodiments, latency may be used to measure the time delay experienced in a system, such as the time delay between the robot and the cloud, the cloud and a computing device having a user interface, and/or the robot and another robot connected via the cloud, etc. Latency may be measured in a variety of ways including, for example, the time taken for a packet of data to transfer from a source to a destination (e.g., one-way latency) or the time taken for a packet of data to transfer from a source to a destination and for the source to receive a response (e.g., round-trip latency). In embodiments, the round-trip latency may include an amount of time that the destination system spends processing the packet. Latency may be optimized by decreasing the one-way and/or round-trip latency.

Figure 7:
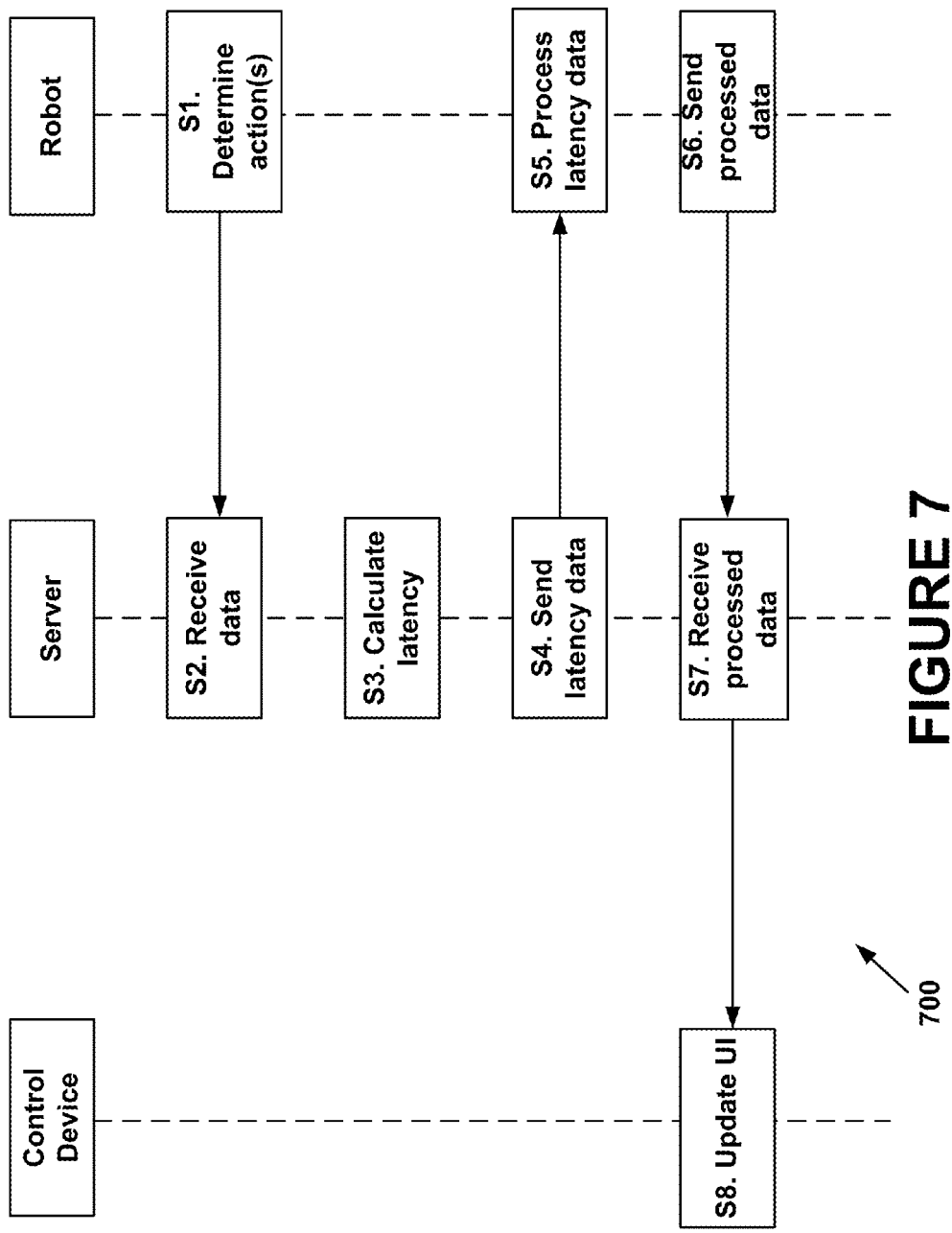
FIG. 7 is a flow diagram of an example method of optimizing latency.

FIG. 7 illustrates a flow diagram of an example method of optimizing latency through reducing the resolution of data, in accordance with at least some embodiments described herein. Method 700 shown in FIG. 7 presents an embodiment of a method that, for example, could be used with the systems 100 and 400 and may be performed by a device, such as a device illustrated in FIGS. 1-4, or components of the device. Method 700 may include one or more operations, functions, or actions as illustrated by one or more of the blocks of the flow diagram. Although the blocks are illustrated in a sequential order, these blocks may also be performed in parallel, and/or in a different order than those described herein. Moreover, one or more of the blocks may be performed by a different device than is shown in FIG. 7. Furthermore, the various blocks may be combined into fewer blocks, divided into additional blocks, and/or removed based upon the desired implementation.

In addition, for the method 700 and other processes and methods disclosed herein, the flow diagram may show functionality and operation of one possible implementation of the present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage system. The computer readable medium may be considered a computer readable storage medium, for example, or a tangible storage device.

At S1, the method 700 may include determine action(s). The process of determining an action may be performed by a robot having any number of sensors and/or mechanical actuators. Actions may broadly include any mechanical, electrical, electromechanical, and/or computational process, event, movement, etc. that the robot may perform.

In some embodiments, actions may be represented as data, which may be generated based on the execution of the action. The generated data may include, for example, the ability of the robot to perform an action, an urgency at which the data should be performed, video data corresponding to a field of view of the robot, audio data received via one or more sensors at the robot, etc. In further embodiments, the generated data may also or optionally include what sensors are operable at the robot, what connectivity protocols are available for the robot to connect to the Internet or to otherwise send data to the server, a frame rate available at the robot, a resolution associated with any visual sensors at the robot, a processing power of the robot, compression algorithms available at the robot, any dependence and/or interoperability that may be required between one or more actions at the robot, etc.

In some embodiments, all or part of the generated action data may be based on real-time data obtained by monitoring actions at the robot. In other embodiments, however, all or part of the generated action data may be obtained with the aid of one or more specifications, which may be stored at the robotic device or the server and may be used to indicate one or more sensors, protocols, or the like that may be available to the robot. In yet further embodiments, the generated action data may be based on a combination of real-time data, historic data, and/or data obtained from one or more specifications.

In embodiments, the action and/or the data associated with the action may be stored in a database at the robot. Additionally or optionally, the robot may provide the generated data to the server, a cloud, a computing device communicatively connected to the robot, etc. The generated data being sent to the server may be provided at a specified resolution, duration, quantity, etc. In particular, the robot may provide the generated data to the server over a network in an order based on a priority and based on a default or determined resolution.

At S2, the method 700 may include receive data. In particular, the server may receive the data from the robot that may include the data generated by the robot based on an execution of the action. Upon receipt, the server may use the received data to determine one or more actions being performed by the robot and/or one or more resources, sensors, or the like that may be used to facilitate the action. In some embodiments, the server may receive the generated action data and send an acknowledgement receipt to the robot indicating that all or part of the data was successfully received.

At S3, the method 700 may include determine or calculate latency. The process of calculating latency may include determining a likely or estimated amount of latency that may result from or be otherwise attributed to the action. The process may also include calculating the latency that may result from processing, receiving, and/or transmitting the data from the server to the robot and/or to the control device. In embodiments, the calculated latency may reflect a one-way or round-trip latency. Moreover, in further embodiments, the latency data may be indicative of the latency attributable to a communication between the robot and a server. In yet an additional example, the latency data may include data indicative of a bandwidth constraint of a network comprising the communication path between the robot and the server.

In some embodiments, the server may compare the calculated latency to a threshold to determine if the calculated latency exceeds the threshold level. The threshold level may indicate an amount of latency that is acceptable in a system given a certain set of parameters, the number and/or type of actions that are being performed, the type of data being transferred, the importance of the data, the time-sensitive nature of the data, the accuracy or precision at which the data should or must be transferred, etc.

At S4, the method 700 may include send latency data. The latency data may be sent from the server to the robot automatically, periodically, upon the happening of an event, etc. In embodiments, the latency data may include the calculated latency. In further embodiments, the latency data may also include whether the calculated latency exceeds the threshold level, an identification of the threshold level, a degree of fluctuation associated with the calculated latency and/or the threshold level, whether the calculated latency is within a certain percentage of the threshold level, whether the threshold level is a mandatory threshold level and/or a discretionary threshold level, etc.

At S5, the method 700 includes process latency data. Processing latency data may be performed by the server, the robot, or any number of computing devices. When performed by a device other than the server, the server may send the latency data to the robot or other computing device for processing. When performed by the server, the server may process the latency data and send the processed data to the robot, for example.

Processing latency data may be performed in a number of ways. For example, in embodiments, processing latency data may include a determination of the latency attributable to one or more of the actions being performed at the robot. This determination may be based on data calculated and received from the server. Optionally, this determination may be calculated using any number of algorithms, database lookups, or the like that may identify or otherwise estimate an amount of latency that is attributable to the robot as a whole or one or more actions being performed at the robot.

In addition to processing the latency data, the robot may also determine a priority associated with one or more of the actions. The priority may, for example, be a rank of the actions being performed at the robot. The rank may be indicative of how necessary or unnecessary the data associated with the action is in performing a task or set of tasks. In some embodiments, the priority may be directly or indirectly associated with the latency. The priority may be used by the robot as a guide in determining an order for sending the generated action data to the server.

As an example, the robot may determine a priority associated with an action based on a safety level of the robot during execution of the action. The safety level may relate to a likelihood of danger or risk associated with an action being performed by the robot. Typically, the robot may strive to maintain at least a certain safety level. This safety level may be directly or indirectly associated with the threshold level. Thus, for example, if the robot is rolling down a sidewalk and approaches a road, the robot may determine the safety level of the robot given the upcoming road obstacle. If the safety level is exceeded, the robot may associate a higher priority to data associated with one or more actions that may affect the safety of the robot. Thus, for example, video data, speed calculation data, etc., which may be used to identify if the road has traffic, may have a higher priority than music data being played on speakers at the robot.

In another example, the robot may determine a priority associated with an action by identifying data collected by a sensor of the robot. The robot may use the collected sensor data to help determine an average latency range associated with the collected sensor data (e.g., via a database lookup), determine if the average latency range is exceeded, identify the amount and frequency at which the data is being collected, determine how much the collected data changes over a period of time, etc. Thus, the robot may give a higher priority to sensor data that changes frequently as opposed to infrequently, with the interpretation being that frequently changing data is likely to be more important given the robot's current actions. The robot may also, for example, give a higher priority to sensors performing certain actions that may be needed to accomplish a task or set of tasks.

The robot may use the processed latency data, the latency threshold, and/or the priority to reduce latency. The process of reducing latency may broadly include the use of any number of evolutionary algorithms, machine learning algorithms, weighting algorithms, etc. One or more of these algorithms may be performed by the robot, server, cloud, and/or other computing device to identify ways to perform one or more of the actions with high or relatively high priorities while meeting at least the threshold level or an acceptable variation thereof.

As an example, when the robot determines that the latency is above (i.e., exceeds) a threshold amount, the robot may use one or more of the algorithms to identify information that should or must be sent to the server. This information may be identified as generated data having a priority above a threshold level. Such information may represent information that should or must be sent from the robot to the server. Once identified, the robot may identify a reduction or change in the resolution, duration, quantity, etc. of the generated data. The robot may apply the reduction or change to the generated data. Thus, for example, generated data may be sent at a first resolution at S1 and a second, reduced, resolution thereafter.

Reducing the resolution of data associated with an action may help reduce latency associated with the action by, for example, decreasing an amount of data provided to the server, decreasing a frequency at which the data is provided to the server, dropping a video or audio feed of the robot, reducing a frame rate at which the robot provides the generated data to the server, providing the generated data based on a different protocol (such as a user datagram protocol (UDP)), reducing or eliminating a type of data that is sent to the server, etc. Data generated but not sent to the server as a result of the reduced resolution may be stored at the robot until the latency returns below the threshold amount. Thereafter, the robot may send the stored data to the server.

In an example, the robot may determine that the latency is above a threshold amount. Responsive to this determination, the robot may identify actions being performed at the robot as including the use of a transmission control protocol (TCP) to transfer video data to the server. The robot may determine (e.g., via a look-up of the TCP specification) that the use of the TCP may place data flow restrictions on the data transfer, thereby limiting the rate at which the robot may send the video data to the server. Moreover, the robot may determine that the TCP may also require retransmission of lost packets, which may cause latency to increase. To reduce latency, the robot may provide data to the server using a different protocol, such as the user datagram protocol (UDP), which allows packets to be dropped. In embodiments, the robot may thereafter send video data via UDP instead of TCP, for example. This reduced resolution may occur indefinitely or until the latency is below the threshold amount.

In another example, the robot may be communicating a call between a first user operating a control device and a second user operably communicating with the robot. The robot may determine that the call data is being transmitted using a third generation (3G) mobile telecommunication standard, but that the robot has transmission standards that are available including fourth generation (4G) mobile telecommunication standards, wireless fidelity (Wi-Fi), etc. The robot may send the generated action data associated with the call to the server. The robot may also send data identifying the current 3G standard being applied and/or the availability of other standards to the server. The server may receive this data and calculate an amount of latency associated with one or more of the actions. The server may also determine a threshold amount. The server may send the latency data and/or the threshold amount to the robot, which may determine that the latency may be reduced below the threshold by using a Wi-Fi standard instead of the 3G standard. Accordingly, the robot may send the generated action data to the server using the Wi-Fi standard instead of the 3G standard.

In yet another example, the robot may have the capability of communicating using 3G and/or Wi-Fi. In this example, however, the robot may determine that the latency attributable to the battery is associated with a higher priority than the latency associated with the communication standard. Accordingly, the robot may determine that Wi-Fi may require comparatively more energy resources than the 3G standard, however, the extra energy needed to communicate via Wi-Fi may outweigh the lower latency for the voice communication. Accordingly, the robot may use 3G, even though the Wi-Fi may have also caused the latency to decrease.

In yet another example, the robot may be performing a time sensitive task and may indicate that priority should be given to actions directly related to the tasks, whereas actions such as background noises or other unnecessary sensor data should be given a lower priority. Data associated with the lower priority data may be stored at the robot while the task is occurring so as to limit the amount of data (and associated latency) that is sent from the robot to the server. In such examples, the robot may store the unsent data and send the stored data to the server at a time when the latency is below the threshold, for example.

At S6, the method 700 includes send processed data. The data at S6 is sent from the robot to the server. The data sent at S6 may include the reduced resolution data.

At S7, the method 700 includes receive processed data. In embodiments, the server may perform an additional latency calculation to determine whether the processed data is below the threshold amount. If the latency calculation is above the threshold amount, the server may send the latency data to the robot for further processing. If the processed data is below the threshold amount or if the processed data is within an allowable range then the processed data may be sent to a control device, robot, computing device, other server or cloud, etc.

At S8, the method 700 includes update user interface. The user interface may include any interface that allows a user to communicate with the control device. In embodiments, the user interface may be operable to communicate data from the robot to the user, for example. Moreover, in further embodiments, the user interface may be further operable to allow the user to communicate and/or to otherwise interact with the robot. An example communication may include the user sending the robot a command instructing the robot to perform an action.

In some embodiments, additional processes may be performed. For example, in an embodiment, the robot may send the generated data to the server. The server may calculate the latency associated with the generated data and may determine if the latency is above a second threshold amount. The second threshold amount may be larger than the threshold amount and may be indicative of the allowable threshold associated with the communication pathway, the server, the cloud, etc. The server may send the second threshold amount to the robot with the latency data, for example. When the latency is above the second threshold, the robot, server, cloud, etc. may determine an alternate communication pathway by which the robot is capable of communicating with the server. The robot may use the alternative communication pathway when communicating with the server.

Figure 8:
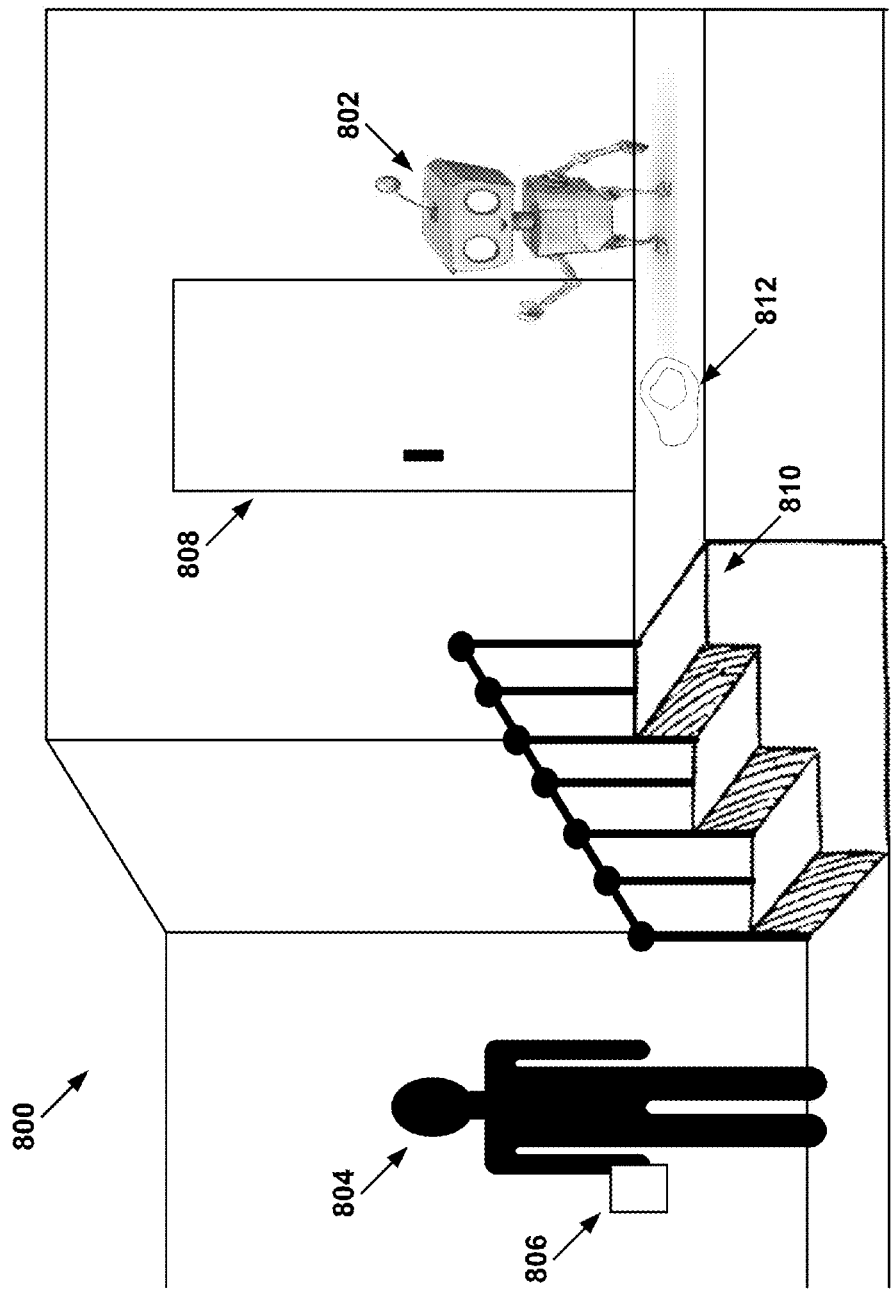
FIG. 8 illustrates an example of a user interacting with a robot according to the method of FIG. 7.

FIG. 8 illustrates an example of a user interacting with a robot according to embodiments described herein. In particular, FIG. 8 includes a robot 802, which may be in communication with a server, cloud, computing device, etc. FIG. 8 also includes a user 804 interacting with a control device 806. The control device 806 may include a mobile telephone, a personal computer, a personal digital assistant (PDA), a tablet computer, a multi-functional device, or any number of computing devices, for example. In some embodiments, the control device 806 may include a visual or audio user interface that may allow the user 804 to interact with the robot 802 directly or indirectly (e.g., via the server).

In some embodiments, the user 804 may interact with the control device 806 to control the robot 802. However, due to latency issues, the data displayed to the user 804 via the control device 806 may be outdated by the time the data reaches the control device 806. Thus, for example, a user 804 wanting the robot 802 to open a door 808 may not be notified that the robot 802 has reached the door 808 until the robot 802 has already passed the door 808. Likewise, a robot 802 may approach a staircase 810 and, before the user 804 is notified of the upcoming hazard, the robot 802 may have already fallen down the staircase 810.

Latency between the robot 802, the control device 806, and/or the server may be optimized according to the systems and/or methods described herein. In an example, the robot 802 may determine the speed at which the robot 802 is moving and may also determine that the pending executable instructions are to continue to move forward at the same or substantially similar speed. The robot 802 may also determine (e.g., using one or more sensors) that a number of obstacles 812 may be in the robot's 802 current path. The robot 802 may process this action data and send the generated data to the server. The server may receive the generated action data and determine the latency associated with the action data. Thus, as an example, the server may determine that the robot 802 is moving at a relatively fast pace and will likely run into one or more obstacles 812 unless the user 804 is provided with details about the robot's 802 movements as soon as the movements occur. The server may calculate the latency associated with the current transmission of data from the robot to the server and/or to the control device 806 and determine that the latency may be too long to allow the user 804 to effectively control the robot 802 using the control device 806. Accordingly, the server may determine that the latency associated with the actions being performed by the robot 802 exceed a threshold amount. The server may send this latency data to the robot 802.

The robotic 802 may use the latency data from the server to reduce the resolution of all or part of the action data generated at the robot. In an example, the robot 802 may determine that the number and/or identification of the obstacles 812 that the robot 802 encounters have a relatively low priority as the robot 802 has instructions to continue forward at the same or substantially the same speed until the robot 802 reaches a predefined endpoint. Accordingly, the robot 802 may determine that the visual quality of the data being sent from the robot 802 may be reduced so as to minimize the amount of latency that may occur between when the visual data is first obtained by the robot 802 and when the visual data is received by the server and/or the control device 806. In some examples, the server may determine that the reduced resolution of the data may include the application of a compression algorithm, which may be applied robot 802 or at the server. In embodiments, the compression algorithm may be applied so as to allow the robot 802 to send compressed visual data to the user 804 instantaneously or near instantaneously. As a result, the user 804 may be able to send and/or receive instructions via the control device 806 expeditiously so as to prevent the robot 802 from running into the obstacle 812 or falling down the staircase 810, for example.

It should be understood that embodiments described above may allow one or more functions of the robot 802 to be performed at the server or at the control device 802. Moreover, in some examples, embodiments may allow the control device 802 to control the robot 802 without an intermediary server or cloud. In such embodiments, the calculation of latency may be performed and/or implemented by the control device 806 and/or by the robot 802.

Moreover, it should be understood that one or more roles of the robot 802, server, and/or the control device may be interchangeable. Thus, for example, the server may calculate a latency associated with the control device 806 and/or determine resolutions to reduce. Accordingly, the server may determine, for example, that the encryption algorithms being used by the control device 806 may require more computational resources (and time) than is necessary for visual data being sent in a casual home environment. As such, the server may remove the encryption algorithm or reduce the application of the encryption algorithm so as to cause the latency to drop below a threshold amount, for example.

6. ROBOT VISION

In some examples, a robot may be moving forward, and may capture image data of the forward view. The image data may be provided to a user, such as, for example, using the method 600 in FIG. 6. However, a user may desire to move a camera on the robot to view a left/right area of the robot (or any area different from a default forward view of the robot). In instances in which the user does not have the ability to remotely move the camera on the robot to obtain a different view, or should the user also still like to have a view of where the robot is going (e.g., a forward view), the cloud may provide a forward facing view as well as alternate views to the user.

Referring back to FIG. 5, the robot 500 may be moving forward toward point A, and a camera on the robot may capture image data of the forward view toward point A. A user may desire to see a view to the left of the robot toward point B, such as, for example to determine whether to cause the robot to turn left. The user may query the cloud for an alternate view of the robot, and the cloud may provide the alternate view.

In some examples, in response to a query from a user, the cloud may determine a location of the robot and a directional view desired by the user based on the location of the robot, and develop a representation of the desired view. In some examples, the representation of the desired view may be synthesized from data and not an actual representation of a view from an available camera. In other examples, the representation of the desired view may be developed from actual camera views. The server may develop the representation of the desired view using any functions of the method 600 in FIG. 6, such as to access a database to retrieve image data corresponding to the desired view.

In some examples, the cloud may provide image data to the user representing multiple views from a location of the robot. For example, the cloud may provide image data representing a forward, backward, left and right view from a location of the robot.

7. ROBOT USER INTERFACE

Figure 9:
FIG. 9 illustrates an example robot-user interface.

FIG. 9 illustrates an example robot-user interface 900. In FIG. 9, the robot-user interface 900 is displayed on a screen. The robot-user interface 900 functions to provide image data to a user that represents a view of the robot (e.g., a backward, forward, left, right view, etc.).

As shown, the robot-user interface 900 may be overlaid onto the image data, such as overlaying the robot-user interface 900 onto real-video (e.g., a video feed). The robot-user interface 900 enables a user to control actions of the robot. Using the robot-user interface 900, the user sees the video feed from the robot, and the interface overlays onto the view of the robot enabling the user to select items in the view, etc., thereby making the video-feed a part of the interface and allowing the user to manipulate items in the video feed. Similarly, graphics of the user interface can be overlaid onto the video feed.

The robot-user interface 900 may include many user controls, such as a slide bar zoom control 902 in which a user may zoom in or out on an area of the image by sliding the bar up or down. The robot-user interface 900 may also include a navigation control 904 including up/down and left/right arrows in which the user may control movement of the robot by pressing the arrows or sliding a finger around the circle on the navigation control 904 to control a direction of movement.

In some examples, the robot-user interface 900 may be provided or configured for use on a touchscreen display so that a user may provide inputs to the robot-user interface 900 by touching the controls.

The robot may be configured to detect objects in a pathway of the robot. In the image in FIG. 9, the robot has detected object 906. The robot-user interface 900 may identify object 906 by placing a box on the object to indicate to the user that the object 906 is being identified. In addition, in some examples, the robot may estimate a distance to the object 906, such as about 80 ft. in the example in FIG. 9. The robot-user interface 900 may provide a graphic 908 to indicate to the user the distance so that the user may control movement of the robot accordingly.

The robot-user interface 900 may further provide graphics 910, 912, and 914 overlaid onto the image. The user may select any of graphics 910, 912, and 914, which may each be individually programmed to execute a function. For example, a user may select graphic 910 to cause the robot to travel to the location marked by the dot "10". Similar functions may be executed by the robot by user selection of graphics 912 and 914.

The robot-user interface 900 may enable the user to interact with or select items in the image as well. For example, the image in FIG. 9 is an aisle in a grocery store. The robot-user interface 900 may enable a user to select a bag of potato chips to the right to cause the robot to pick up or grab the bag of potato chips. In this manner, the robot-user interface 900 may make each item in the image selectable.

To make items in the image selectable, a server (e.g., the cloud) may receive the image data from the robot and may perform object recognition on the image data so as to provide an estimation of locations of objects in the image. The server may then provide the object recognition outputs to the robot-user interface 900 to enable the robot-user interface 900 to map recognized objects with selectable items in the image.

Thus, the robot-user interface 900 enables sensor data to be overlaid onto a video feed, and enables a user to interact with a robot in a three-dimensional environment, for example.

Figure 10:
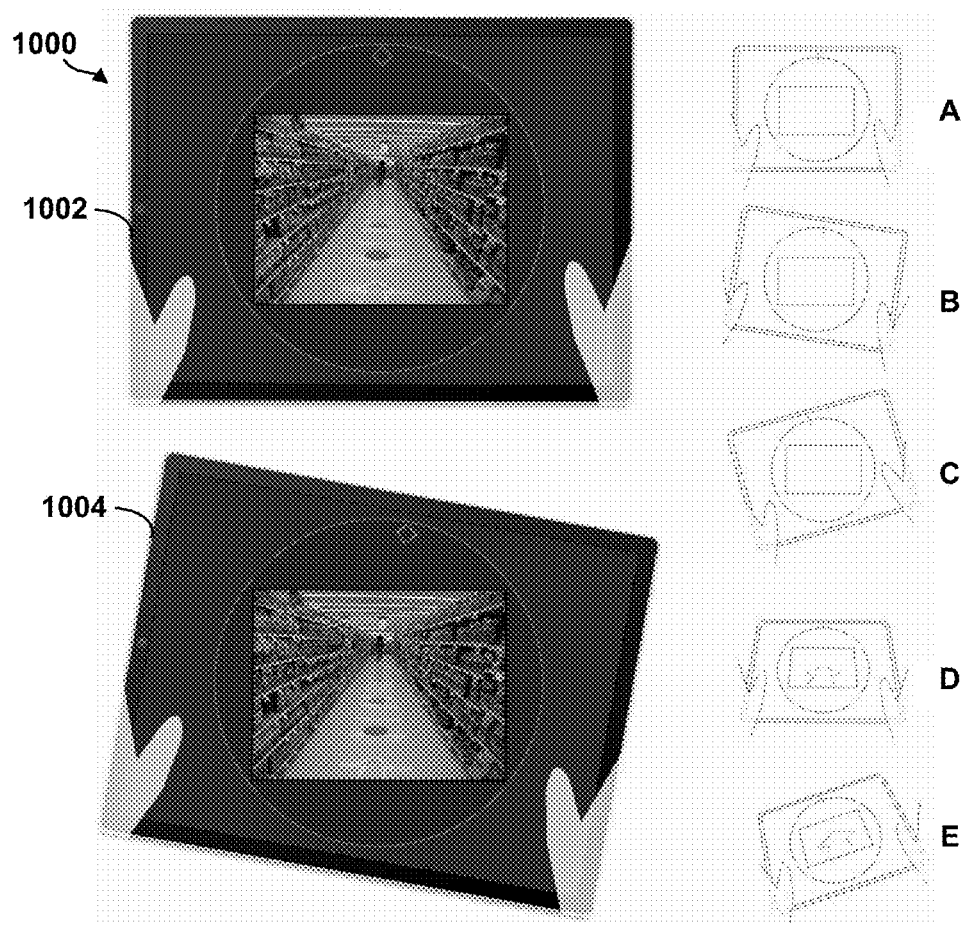
FIG. 10 illustrates example configurations for controlling movement of a robot based on movement of the display device.

In some examples, a robot-user interface may enable control of the robot based on movement of the device on which the robot-user interface is displayed. FIG. 10 illustrates example configurations for controlling movement of a robot based on movement of the display device. As shown, a display device 1000 may display a robot-user interface (e.g., the robot-user interface 900 of FIG. 9). In one example, to cause the robot to turn right, a user may rotate the device, such as shown between images 1002 and 1004, or from images A to B. A user may cause the robot to turn left by rotating the device 1000 in an opposite direction, such as shown in image C. In some examples, the user may cause the robot to move forward or backward by tilting the device 1000 forward or backward as shown in image D. In still further examples, the user may cause the robot to turn and move at the same time by rotating and tilting the device 1000, as shown in image E.

Figure 11:
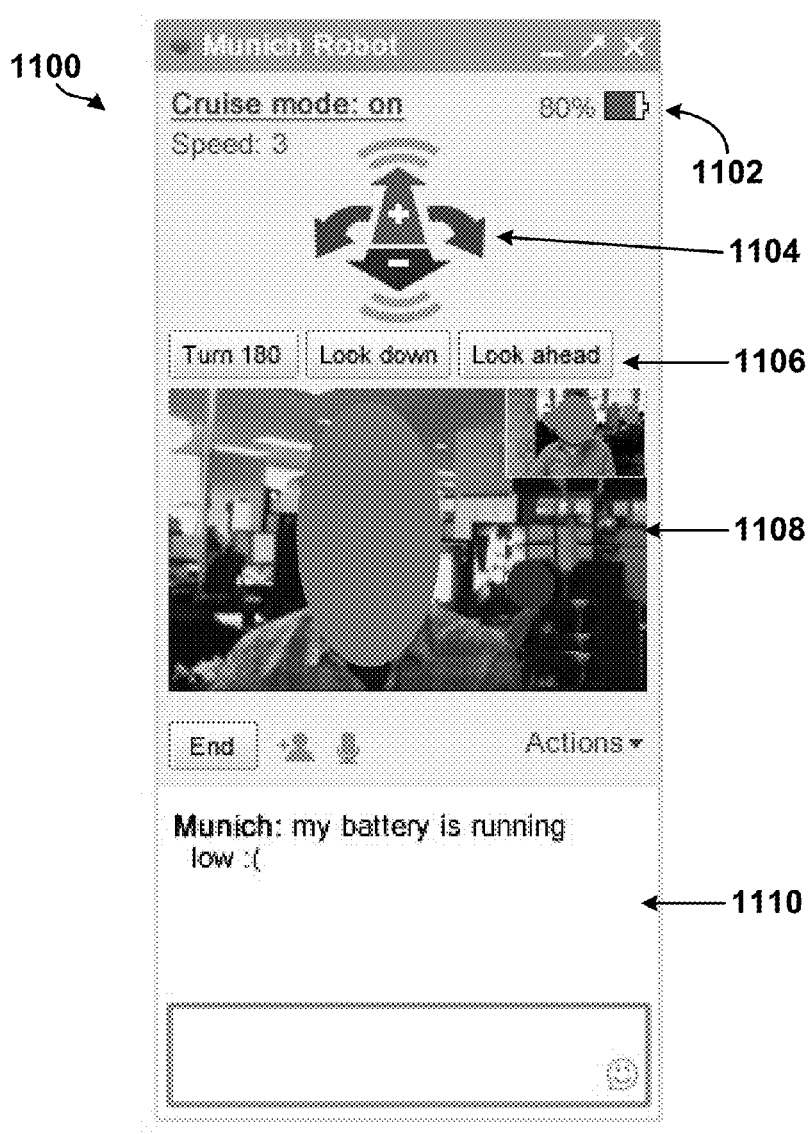
FIG. 11 illustrates another example robot-user interface.

FIG. 11 illustrates another example robot-user interface 1100. The robot-user interface 1100 includes a battery meter 1102, such as to indicate a battery life of the robot, a navigation control 1104 to control movement of the robot, and other functional controls 1106 (e.g., turn 180 degrees, look down, or look ahead). The other functional controls 1106 may be preprogrammed control based on user preferences, for example.

The robot-user interface 1100 also includes a video feed 1108 to show the user a point of view of the robot. Further, the robot-user interface 1100 may include a chat box 1110 in which the robot may provide messages to the user.

8. CONCLUSION

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense. Further, it is intended that the following clauses as further describing aspects of the present description.

What is claimed is:

1. A method comprising:
   determining an action being performed by a robotic device, wherein the robotic device includes a mechanical actuator;
   based on execution of the action, the robotic device generating data for a computing device, wherein the generated data includes video data and audio data, the video data having a first resolution and protocol data indicative of a communication protocol for the robotic device to communicate the video data;
   receiving information from the computing device that is indicative of a latency attributable to communication between the robotic device and the computing device;
   based on the latency, determining a latency level associated with the latency attributable to the communication of the generated data and a priority at which to provide the video data and the audio data to the computing device, wherein the priority is based on a frequency at which the generated data changes over a period of time;
   responsive to determining that the latency level is above a first threshold and below a second threshold, providing, by the robotic device, the video data and the audio data to the computing device in an order based on the priority at a reduced resolution version of the video data to the computing device and discontinuing transmission of the audio data to the computing device, wherein the second threshold is more than the first threshold; and
   responsive to determining that the latency level is above the second threshold, determining an alternate communication pathway by which the robotic device is capable to communicate with the computing device, and communicating with the computing device over the alternate communication pathway.

2. The method of claim 1, wherein the video data corresponds to a field of view of the robotic device.

3. The method of claim 1, wherein the generated data further comprises information based on a safety level of the robotic device during execution of the action.

4. The method of claim 1, wherein the generated data further comprises data collected by a sensor of the robotic device.

5. The method of claim 1, further comprising responsive to determining that the latency level is above the first threshold and below the second threshold, reducing a frame rate at which the robotic device provides the video data to the computing device.

6. The method of claim 1, wherein receiving information from the computing device that is indicative of the latency attributable to the communication between the robotic device and the computing device comprises the robotic device receiving information indicative of a bandwidth constraint of a network comprising a communication path between the robotic device and the computing device.

7. The method of claim 1, further comprising responsive to determining that the latency level is above the first threshold and below the second threshold, providing by the robotic device the generated data to the computing device based on a user datagram protocol (UDP).

8. The method of claim 1, further comprising:
   responsive to determining that the latency level is above the first threshold, storing the generated data having the first resolution; and responsive to determining that the latency level is below the first threshold, providing by the robotic device the stored generated data to the computing device.

9. A system comprising:
a robotic device having a sensor;
a computing system including a non-transitory computer-readable medium; and
program instructions stored on the non-transitory computer-readable medium and executable to cause the computing system to:
  determine an action being performed by a robotic device, wherein the robotic device includes a mechanical actuator;
  based on execution of the action, the robotic device generating data for a computing device, wherein the generated data includes video data having a first resolution, and protocol data indicative of a communication protocol for the robotic device to communicate the video data;
  receive information from the computing device that is indicative of a latency attributable to communication between the robotic device and the computing device;
  based on the latency, determine a latency level associated with the latency attributable to the communication of the generated data and a priority at which to provide the generated data to the computing device, wherein the priority is based on a frequency at which the generated data changes over a period of time;
  responsive to determining that the latency level is above a first threshold and below a second threshold, provide, by the robotic device, the generated data to the computing device in an order based on the priority at a reduced resolution version of the video data to the computing device and discontinuing transmission of the audio data to the computing device, wherein the second threshold is more than the first threshold; and
  responsive to determining that the latency level is above the second threshold, determining an alternate communication pathway by which the robotic device is capable to communicate with the computing device, and communicating with the computing device over the alternate communication pathway.

10. The system of claim 9, further comprising program instructions stored on the non-transitory computer-readable medium and executable to cause the computing system to:
  responsive to determining that the latency level is above the first threshold and below a second threshold, reduce a frame rate at which the robotic device provides the generated data to the computing device.

11. The system of claim 9, further comprising program instructions stored on the non-transitory computer-readable medium and executable to cause the computing system to:
  responsive to determining that the latency level is above the first threshold and below the second threshold, provide by the robotic device the generated data to the computing device based on a user datagram protocol (UDP).

12. The system of claim 9, further comprising program instructions stored on the non-transitory computer-readable medium and executable to cause the computing system to:
  responsive to determining that the latency level is above the first threshold and below the second threshold, store the generated data having the first resolution; and
  responsive to determining that the latency level is above the first threshold and below the second threshold, provide by the robotic device the stored generated data to the computing device.

13. A non-transitory computer-readable memory having stored thereon instructions executable by a computing device having at least one processor to cause the computing device to perform functions comprising:
  determining an action being performed by a robotic device, wherein the robotic device includes a mechanical actuator;
  based on execution of the action, the robotic device generating data for a computing device, wherein the generated data includes video data having a first resolution, and protocol data indicative of a communication protocol for the robotic device to communicate the video data;
  receiving information from the computing device that is indicative of a latency attributable to communication between the robotic device and the computing device;
  based on the latency, determining a latency level associated with the latency attributable to the communication of the generated data and a priority at which to provide the generated data to the computing device, wherein the priority is based on a frequency at which the generated data changes over a period of time;
  responsive to determining that the latency level is above a first threshold and below a second threshold, providing, by the robotic device, the generated data to the computing device in an order based on the priority at a reduced resolution version of the video data to the computing device and discontinuing transmission of the audio data to the computing device, wherein the second threshold is more than the first threshold; and
  responsive to determining that the latency level is above the second threshold, determining an alternate communication pathway by which the robotic device is capable to communicate with the computing device, and communicating with the computing device over the alternate communication pathway.

14. The non-transitory computer-readable memory of claim 13, wherein the function of generating data for the computing device comprises generating video data corresponding to a field of view of the robotic device.

15. The non-transitory computer-readable memory of claim 13, wherein the function of providing the reduced resolution version of the generated data to the computing device comprises decreasing an amount of data provided to the computing device.

16. The non-transitory computer-readable memory of claim 15, wherein the function of decreasing the amount of data provided to the computing device comprises dropping an audio feed of the robotic device.

* * * * *